United States Patent Office 3,143,723
Patented Aug. 4, 1964

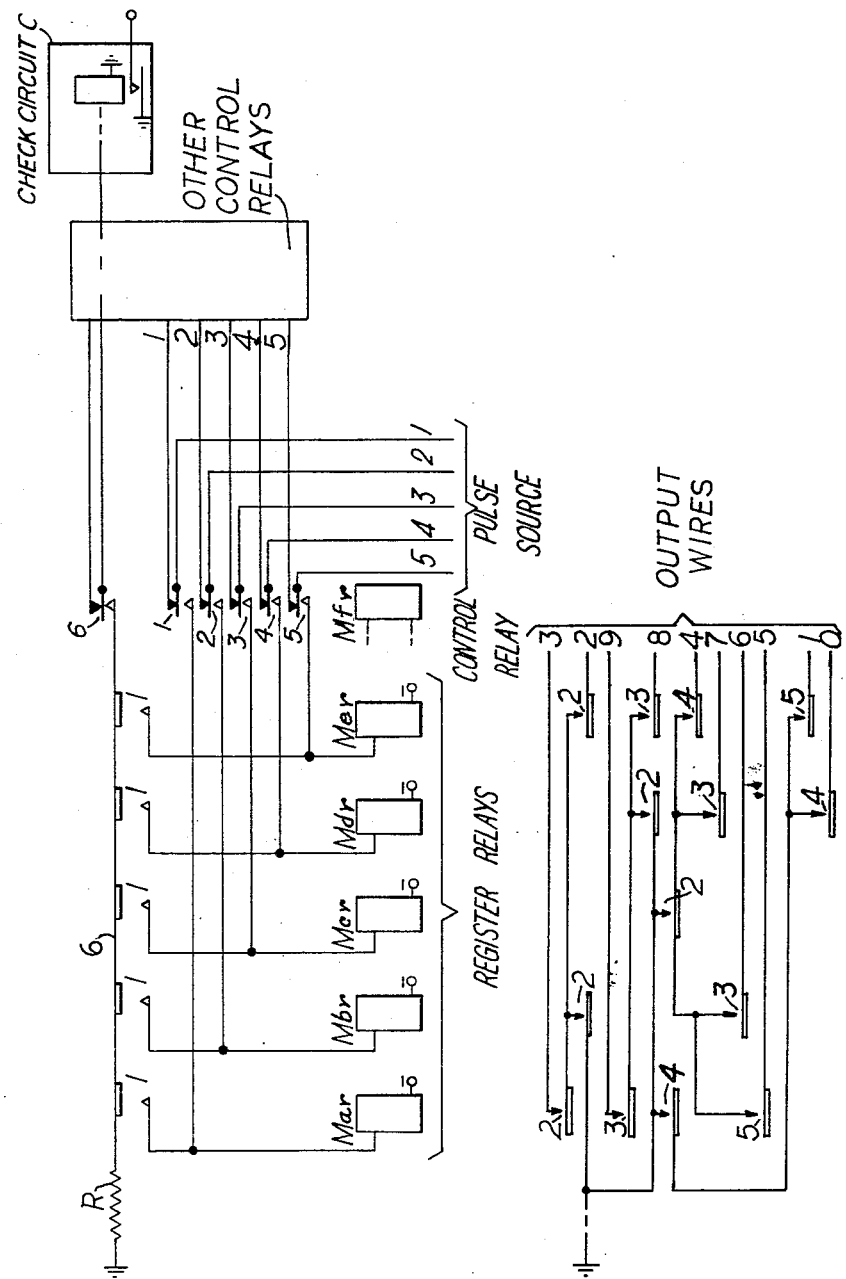

3,143,723
REGISTERING CIRCUIT
Egide Jacob Hendrik De Raedt and Henri Albert Julia Verhille, Antwerp, Belgium, assignors to International Standard Electric Corporation, New York, N.Y., a corporation of Delaware
Filed May 29, 1962, Ser. No. 198,563
Claims priority, application Netherlands May 31, 1961
2 Claims. (Cl. 340—146.1)

The present invention relates to a registering circuit for registering in code form a digital information, including a group of registering relays which are energized in a distinct combination in response to signals applied to input leads which are individually coupled, on the one hand with the windings of said registering relays and on the other hand with a common lead via make contacts of said registering relays, the common lead being coupled with a check circuit, with an associated check relay, for checking the correct receipt of the digital information, in which case the check relay is energized.

Such a registering circuit is already known from the Dutch Patent 75,457. In the circuit described therein, on the one hand the operated registering relays are blocked via the check circuit and the associated make contacts, and on the other hand the check relay is energized via the check circuit in order to indicate that a correct digital information has been received and that the further operations may be executed. Hence, the energization of check relay and the blocking of the operated registering relays is executed via two different circuits having a common part which is constituted by the check circuit. It may therefore happen that, notwithstanding the fact that the check circuit has been correctly operated and hence has energized the check relay, one of the operated registering relays has not been locked due to the erroneous condition of the associated make contact which has not been closed. Obviously such an erroneous operation is completely undesirable.

The main object of the invention is to provide a simple circuit wherein the check relay is energized only when the registering relays are simultaneously operated and locked in a combination corresponding with the digital information received.

A further disadvantage of the circuit according to said Dutch Patent 75,457 is that a rectifier has to be included in the common lead in order to prevent signals applied during a short time to the windings of the registering relays via the input leads of accidently energizing the check relay.

It is therefore another object of the present invention to provide a circuit wherein the presence of such a rectifier is not required.

The present invention is characterized by the fact, that the common lead is coupled with an impedance which forms a potentiometer with the windings of said registering relays and that the check circuit with an associated check relay, is constituted by a potential detector, with an associated check relay which is energized only upon a digital information being correctly received and upon the then operated registering relays being locked.

It should be remarked that the U.S. Patent 2,484,226 discloses a registering circuit for registering in code-form a digital information, including a group of registering relays which are energized in a distinct combination in response to signals applied to input leads which are individually coupled, on the one hand with the windings of the registering relays and on the other hand with a check circuit via impedances which form a potentiometer together with the windings. Also, this check circuit can only respond when a characteristic potential is applied to its input. The circuit according to this U.S. patent is however not adapted to block the relays energized.

The above mentioned and other objects and features of the invention will become more apparent and the invention itself will be best understood by referring to the following description of an embodiment taken in conjunction with the accompanying drawing which schematically represents a registering circuit according to the present invention.

The circuit includes a number of groups of registering relays and to each of these groups is associated a control relay, e.g. ,to the group of registering relays Mar–Mer is associated the control relay M$fr$. The different control relays form part of a stepping circuit which is arranged in such a manner that when all preceding control relays are energized, the next energized control relay disconnects the input leads 1–5 from the preceding group and connects these input leads with the windings of the five registering relays of the associated group.

Two of these five leads 1–5 are grounded upon a digit being received. This grounding action is for instance executed by a not shown receiver adapted to receive signals at voice frequency.

When for instance the control relay M$fr$ is energized, the input leads 1–5 are disconnected from the preceding $m^{th}$ group via the contacts 1 to 5 of relay M$fr$ and connected with the windings of the registering relays Mar–Mer of the associated $n^{th}$ group. When for instance the leads 1 and 5 are grounded, the registering relays Mar and Mer are energized as follows: battery, windings of the relay Mar and Mer respectively, make contacts 1 and 5 respectively, of relay M$fr$ to input leads 1 and 5 respectively, ground. The registering relays Mar and Mer are locked as follows: battery, windings of these relays, common input lead 6, resistance R, ground.

This common lead 6 is further connected with the check circuit C via the contact 6 of the relay M$fr$ and the the contacts of the control relays of the following groups of registering relays, so as for instance the contact 6 of the relay Z$fr$ (not shown) of the $z^{th}$ group of register relays.

This check circuit C is constituted by a potential detector with an associated check relay and is of the type described in the Belgian Patent No. 607,583 (A. Peeters, S. Simon, E. De Raedt, 1–13–9). This check circuit is therefore not described in detail. Its operation is such that the associated check relay can only be energized when a predetermined characteristic input potential is applied to the input of the check circuit.

The values of said resistance R and of the resistances of the windings are chosen in such a manner that said common lead 6, which constitutes in fact the connection between this resistance R and these windings forming a potentiometer, only reaches the predetermined potential when a correct digit has been received i.e. when two out of five registering relays Mar–Mer, e.g., Mar and Mer, are energized. The output wires 0–9 are arranged for providing a decimal indication of the two-out-of-five code registered on the relays M$f$1 to M$f$5.

Supposing that this is the case and that the ground is disconnected from the input leads 1 and 5, then the check relay of the check circuit is energized. Thus one is sure that on the one hand the registering relays energized have been blocked and that on the other hand a correct digit has been received.

It should be remarked that notwithstanding the fact that in the present circuit use has been made of registering relays with one winding a rectifier need not be included in the common lead. Indeed, signals which are applied during a short time to the windings of the relays such as Mar–Mer via the input leads 1—5 are not able to accidentally energize the check relay.

Next to the last mentioned advantage the present circuit is also characterized by the static character of the check circuit used due to which the registering relays have to be provided with a single make contact only.

While the principles of the invention have been described above in connection with specific apparatus, it is to be clearly understood that this description is made only by way of example and not as a limitation on the scope of the invention.

What is claimed is:

1. In a registering circuit for storing digital information in code form, a power source, a plurality of relays having one side of their winding connected to one pole of the said power source, a locking conductor having resistance means connected in series therewith and connected to the other pole of said source, means responsive to the operation of any said relay for connecting the other side of the relay winding to said locking conductor to form a potential divider with said resistance means, and indicating means for indicating a predetermined potential on said locking conductor.

2. A registering circuit as set forth in claim 1 wherein said indicating means includes a check relay connected to said locking conductor.

No references cited.